United States Patent [19]

Appel et al.

[11] Patent Number: 5,313,291
[45] Date of Patent: May 17, 1994

[54] METHOD FOR MATCHING COLOR PRINTS TO COLOR IMAGES ON A MONITOR SCREEN

[75] Inventors: James J. Appel, Brighton; John A. Durbin, Webster, all of N.Y.; Richard F. Lehman, Nashua, N.H.

[73] Assignee: Xerox Corporation, Stamford, Conn.

[21] Appl. No.: 797,671

[22] Filed: Nov. 25, 1991

[51] Int. Cl.⁵ .......................... H04N 1/46; G03F 3/08
[52] U.S. Cl. .................................. 358/501; 358/504;
    358/518; 358/519; 358/520; 358/523; 395/109
[58] Field of Search ................ 358/76, 75, 406, 80,
    358/296, 10, 139, 244, 518, 520, 523, 519, 504,
    501; 356/405; 395/109, 131

[56] References Cited

U.S. PATENT DOCUMENTS

| | | | |
|---|---|---|---|
| 4,500,919 | 2/1985 | Schreiber | 358/78 |
| 4,670,780 | 6/1987 | McManus et al. | 358/80 |
| 4,794,460 | 12/1988 | Shiota | 358/244 |
| 4,829,455 | 5/1989 | Long et al. | 395/131 |
| 4,875,032 | 10/1989 | McManus et al. | 340/703 |
| 4,929,978 | 5/1990 | Kanamori et al. | 355/38 |
| 4,967,265 | 10/1990 | Rees et al. | 358/75 |

Primary Examiner—Edward L. Coles, Sr.
Assistant Examiner—Scott A. Rogers

[57] ABSTRACT

A color correction method is provided for an electronic printing system that results in a color print that is made as close as possible to what an operator actually observes on a monitor screen (What you see is what you get). The printing system includes a computer, a color printer, and a color monitor.

A calibration is automatically performed by the system's computer through the use of calibration software, a series of test patterns stored in the computer memory, a monitor calibrating device, and a scanner equipped with color trichromatic measurement capabilities.

9 Claims, 6 Drawing Sheets

METHOD FOR MATCHING COLOR PRINTS TO COLOR IMAGES ON A MONITOR SCREEN

BACKGROUND AND MATERIAL DISCLOSURE STATEMENT

The present invention relates to an automatic method of color correction for an electronic printing system and, more particularly, to a method of calibrating a color printer and a color monitor so that the appearance of a color print generated by the electronic color printing system closely approximates the appearance of the color image on the monitor screen at the time of printing.

Various color correction methods are known in the prior art for matching a scanned color original document to a printed color output. Representative disclosures are found in the following U.S. Pat. Nos.

4,929,978 (Kanamori et al.) discloses a method wherein a color scanner scans an original color image to obtain successive input color values, each value expressed in tricolor color space. A color correction table memory is responsive to one of the input color values for producing corrected data comprising corresponding output color values. A color printer responsive to the output color values reproduces the original color image as an output color image.

U.S. Pat. No. 4,500,919 (Schreiber)—FIG. 1 shows the basic system for scanning an original color document and analyzing it to obtain color patch input data values. A color correction system is used to modify the color image on a monitor and color print so that they look like the original scanned document.

There are several techniques known in the art for matching a color video display to a color print. U.S. Pat. No. 4,670,780 (McManus et al.) describes a method of matching hardcopy colors to video display color using a series of color transforming algorithms to effect the color matching. U.S. Pat. No. 4,875,032 (McManus et al.) discloses a method for reproducing colorimetric parameters of a color sample for reproducing the color of the sample on a video monitor screen. A color filter assembly and an associated sensor are used to generate signals indicative of the colorimetric parameters of the illuminated color sample. A computer transforms the signals into a form suitable for driving a video monitor to reproduce the color sample on the monitor screen. Also disclosed is a partially automated system for calibrating the intensity response of CRT monitor phosphor sets to each of a plurality of electron gun control levels utilizing the color filter assembly and associated sensor.

For some electronic color printing systems, it is more important that the color print produced by the color printer matches the color image displayed on the color monitor. This mode of operation is sometimes referred to as "What you see is what you get" (WYSIWYG). One example would be a system where a color image is created or present in computer software, and therefore does not exist as an original color document which must be scanned and inputted to the computer. Another situation would be a mixed, computer-created image consisting of stored color signals merged with inputted signals from a scanned document, or inputted digital color signals from a scanned color photograph. In these situations the operator composes the image on the video screen by manipulating the electronic images, varying the colors on the screen, using readily available software, and performing other editing functions such as cropping, air brushing, merging, etc. When he is satisfied with the image on the screen, the present invention describes a technique for producing a color print that matches as close as possible what is displayed on the screen. Thus, the color print is matched to the video display.

The present invention is directed towards a novel calibration process in which an input scanner is used to calibrate the printer, (although other suitable colorimetric measuring devices can also be used) and a monitor calibration device is used to calibrate the monitor. For the printer calibration, a number of test pattern patches are printed, under control of calibration software in a computer, which span the entire color gamut which the printer is capable of printing. The printed test patterns are scanned by an input scanner (or other suitable colorimetric measuring device), adapted to simulate the CIE tristimulus functions. The computer software analyzes the scanned readings and tristimulus values [Xp, Yp, Zp] are established for each patch. These coefficients [Xp, Yp, Zp] are associated with the corresponding [C, M, Y, K] print signals which were used to print that patch.

The monitor is calibrated by means of an arrangement including three photodiodes, each with an associated color filter, to simulate the tristimulus response. A lens may or may not be used. This calibration technique includes ambient room lighting conditions and therefore views the monitor screen in a close approximation to how the monitor image would appear to an operator. Under control of the monitor calibration software, the colors of the entire monitor screen are sequentially changed, bringing up all possible color values that the computer is capable of generating and displaying. Each color reading is displayed with specific values [Bm, Gm, Rm] assigned to the blue, green, and red electron guns in the monitor. The trichromatic coefficients [Xm, Ym, Zm] for each monitor color are read by the monitor calibration device. These coefficients [Xm, Ym, Zm] are associated with the corresponding electron gun codes [Bm, Gm, Rm]. The calibration process, described in greater detail below, results in a mapping of the color monitor electron gun generation codes [Bm, Gm, Rm] to the color actually measured by the calibrating device [Xm, Ym, Zm], which is a close approximation to what the operator's eye would see on the screen.

In operation, following printer and monitor calibration, the software limits the operator's choice of colors to fall within the range of which the printer is capable of creating.

Thus, the present invention is generally directed towards a method for calibrating a color printer and a color monitor so that a computer generated print code [C, M, Y, K] is sent to the printer which causes a print to be made which has the same tristimulus values [Xp, Yp, Zp] as the color that appears on the monitor [Xm, Ym, Zm]. More particularly, the present invention relates to a method for calibrating a color printing system which includes a color monitor, color printer, and source of digital color signals including the steps of:

storing in a controller memory, a predetermined number of sets of C, M, Y, K print codes, each set associated with a specific color value to be printed, applying said print code sequentially to a color printer for producing color output prints carrying color patches, each patch corresponding to a specific C, M, Y, K print code applied to said printer, measuring each said color patch under a particular set of spectral illumination conditions and establishing tristimulus values Xp, Yp, Zp, for each measured color patch, correlating each measured Xp, Yp, Zp value with the associated C, M, Y, K print code, and storing each correlation in a memory lookup table, storing in said controller memory, a predetermined number of sets of coded digital signals Bm, Gm, Rm, representative of all possible colors capable of being created on a particular color CRT monitor, applying said coded digital signals sequentially to the associated electron gun of said color CRT monitor, each coded digital signal set creating a color image with a specific Bm, Gm, Rm, tristimulus value, measuring each said color image in an environment which closely approximates the actual viewing condition of an operator observing the color image at a specific distance from the monitor, each measurement establishing a set of tristimulus values, Xm, Ym, Zm, and correlating each Xm, Ym, Zm set with the associated applied Bm, Gm, Rm gun code signals, and storing each said correlation in said memory lookup table whereby upon selection by an operator of a print operation to print a specific color image displayed on the monitor, a print code C, M, Y, K is generated which is correlated with the stored monitor gun code that produced that particular color image on the screen resulting in an output print that has the same tristimulus values as the color image on the screen.

DETAILED DESCRIPTION OF THE INVENTION

While the invention is described in some detail below with reference to a specific embodiment, it is to be understood that there is no intention to limit it solely to that embodiment. On the contrary, the intent is to cover all modifications, alternatives, and equivalents of the invention, as defined by the appended claims.

At the outset it will be helpful to briefly define some of the terminology that is used herein.

As is known, color can be described with three variables. Blue, green, and red light emitted by a CRT monitor, or contained by the light emitted by a source and reflected from an object, determines the characteristic of the light reaching the eyes. This is called the "stimulus". Three variables (B, G, and R) usually are sufficient to define a color stimulus. These values are called tristimulus values or trichromatic values.

A pixel is defined as the smallest area of the monitor or print which can be independently colored. The transformation from monitor pixel values to printer pixel values determines the amounts of ink or toner required to reproduce each blue, green, and red (B, G, R) triad displayed on the monitor, and it is specific to a particular monitor/printer pair. There is no simple relationship between the pixel values driving the blue, green and red phosphors of a CRT monitor and the pixel values that are needed to produce an acceptable print. The present invention is directed towards a system to establish such a relationship.

The color components of a pixel on the print are described with three or more variables called the pixel components. The notation [C, M, Y, K] indicates the code sent to the printer. [C, M, Y, K] represents the amounts of cyan, magenta, yellow, and black colorant, respectively, that the printing system is requested to place on the page at a given pixel location. These pixel values range from 0 to max. For example, if each of the color components is defined by an eight bit byte, they have integer values in the range 0 to 255. $C=M=Y=K=0$ means that no colorant is to be applied, while $C=M=Y=K=255$ means that all toners or inks are to be applied maximally. In the interval between 0 and 255, the printing system responds monotonically (i.e. the density of the printed dot increases monotonically).

The notation [Bm, Gm, Rm] also denotes monitor pixel value amounts of blue, green, red, respectively. Thus, a monitor pixel value [Bm, Gm, Rm]=[0, 0, 0] implies a very dark color close to black (i.e. "monitor black"), while a value [Bm, Gm, Rm]=[max, max, max] implies a color very close to white (i.e. "monitor white").

The present color correction calibration can be best understood by identifying the three main functional steps required for the calibration, and examining each step in detail. The three steps are: printer calibration, monitor calibration, and screen display adjustment during operation.

Figure 1:
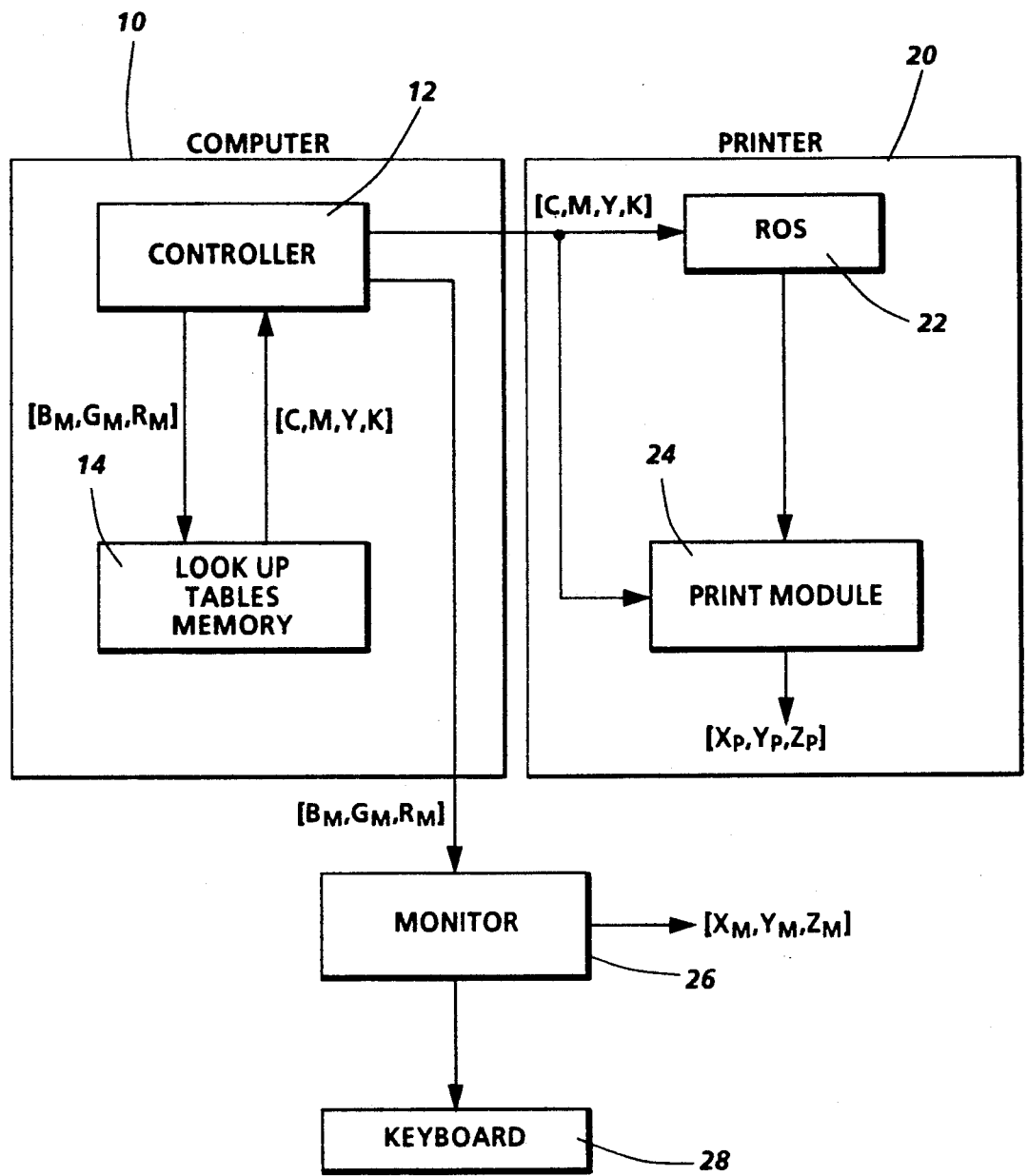
FIG. 1 is a block diagram of the color imaging system of the invention, including a computer, color printer, and color monitor.

FIG. 1 shows a block diagram of the basic architecture of a color image printing ("printer") system according to the present invention. Computer 10 contains a microprocessor controller 12 and look up tables memory 14. Lookup tables memory 14 stores monitor electron gun color generation codes [Bm, Gm, Rm] and the corresponding print generation codes [C, M, Y, K]. The tables are generated by a calibration procedure to be discussed below. The digital output cyan (C), magenta (M), yellow (Y), and black (K) signals drive a laser source in printer 20. Laser ROS 22 emits an output beam that is scanned across a photoreceptor, located in print module 24. Image lines are exposed at the photoreceptor with each scan, to create a latent electrostatic image, which is developed by an appropriately colored marking module.

A color digital signal from controller 12 produces a colored display on the monitor screen. Monitor 26 incorporates a color CRT display and an associated keyboard 28, by means of which the color produced on the monitor screen can be adjusted. According to a first aspect of the invention, the color images, as viewed by an operator at the monitor source, will closely approximate the appearance of a color print made by the printer. This operating condition is enabled by previous calibrations of the printer and the monitor. These calibrations will now be described.

PRINTER CALIBRATION

Figure 2:
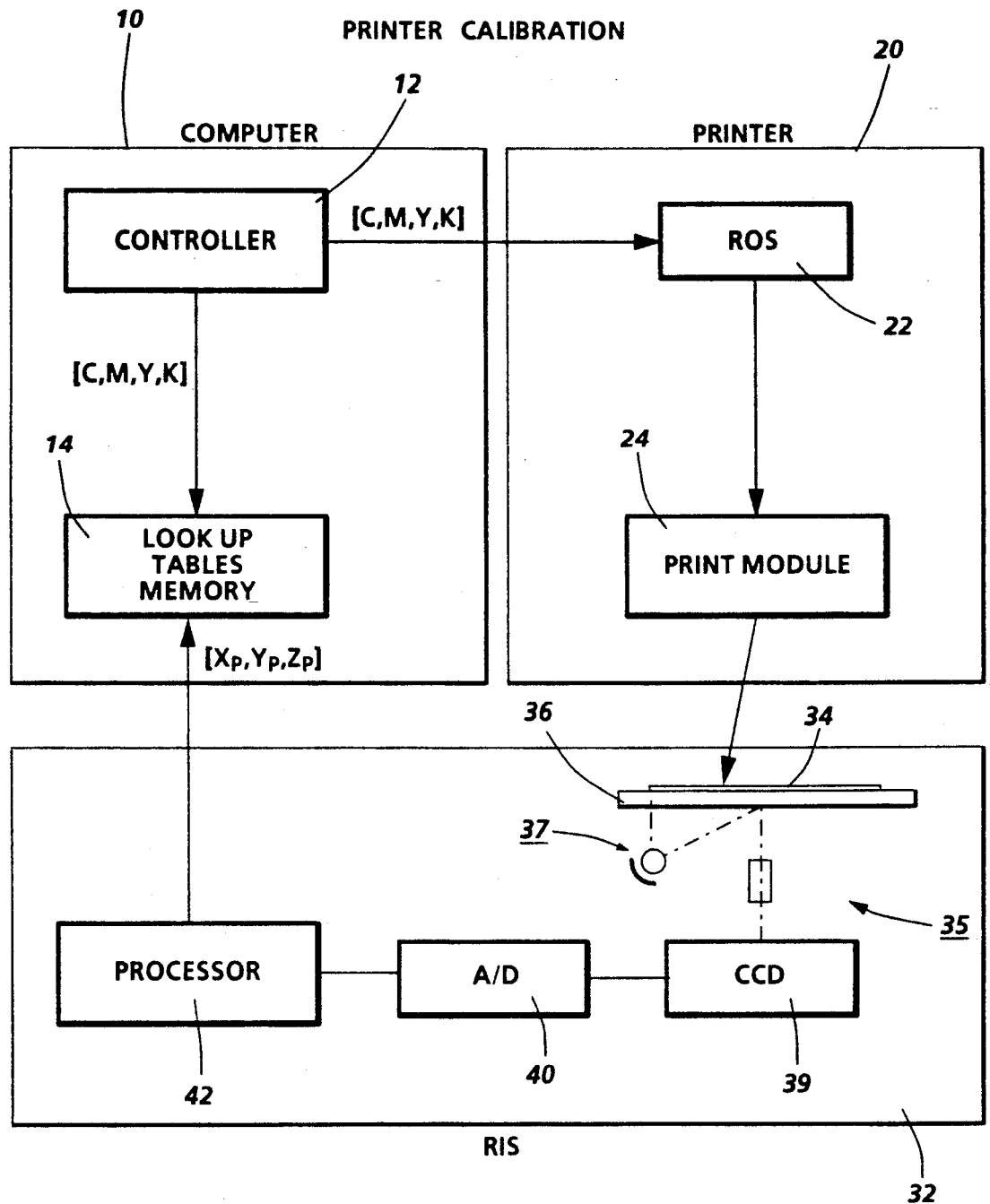
FIG. 2 is a schematic block diagram of the calibration circuit for calibrating the printer of FIG. 1.
Figure 3:
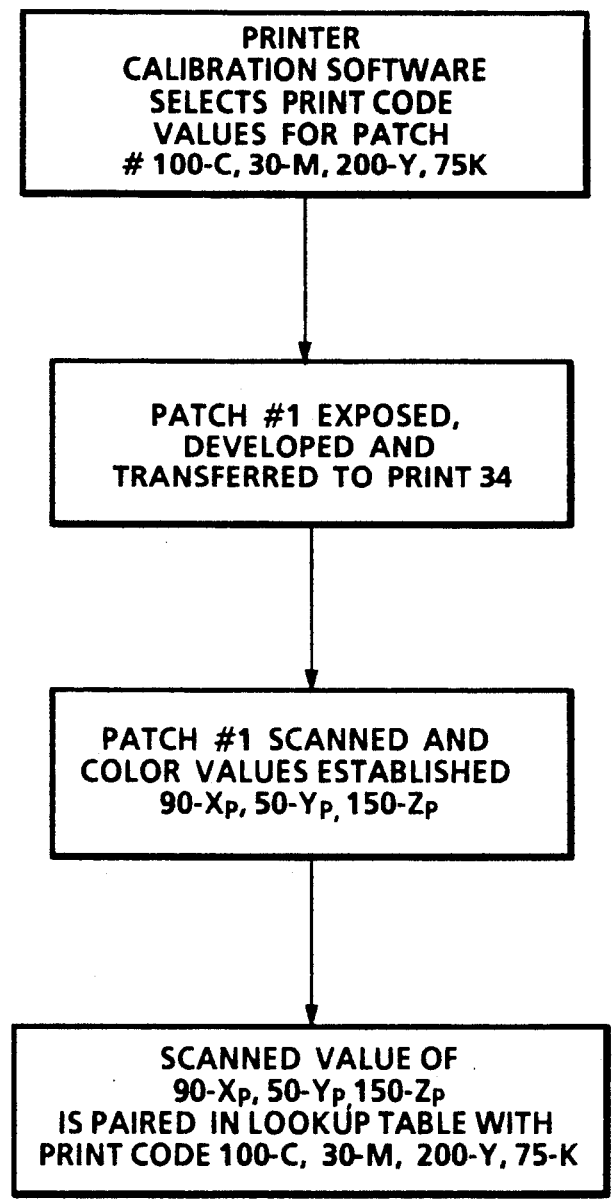
FIG. 3 is a flow chart showing the printer calibration process.

Referring to FIG. 2, controller 12 has stored therein a predetermined number of sets of cyan (C), magenta (M), yellow (Y), and black (K) print codes or signals, each set associated with a specific color value to be printed. The computer is programmed so that signals can be generated which will print out the entire color gamut of which the printer is capable of printing, and includes values providing maximum printing density for C, M, Y, and K colors to values providing minimum density for these colors. These signals are applied to ROS 22 which exposes a plurality of color regions on the photoreceptor in print module 24. The color regions are developed and transferred to at least one color output print 34, which will carry fixed color images of the different hues and lightness regions. These regions are generally referred to as color patches. The exposure, development, and transfer steps are conventional and the disclosure in, for example, U.S. Pat. No. 4,967,265, assigned to the same assignee as the present invention, may be used to implement these steps. As shown, print 34 is scanned by a Raster Input Scanner (RIS) 34 (although it could also be measured by a suitable colorimeter). Print 34 is placed on a platen 36 and scanned by a RIS 35, comprising scanning light source 37 and a linear lens array 38, onto a linear color CCD array 39, which is provided with a filter over the pixel elements of the sensors, which simulate the CIE tristimulus function. The analogue signals from the CCD array 39 are converted to digital signals in A/D Converter 40. They are then processed in processor 42 and sent to memory 14 where the digital inputs are analyzed and tristimulus values [Xp, Yp, Zp] are established for each scanned color patch. These coefficients are then associated with the corresponding [C, M, Y, K] signals which were used to print out that particular patch. This association would be in the form of two arrays of 4 or 5 numbers each for each set of values (patch number, Xp, Yp, Zp), which would map the [Xp, Yp, Zp] values measured by the input scanner to the [patch number, C, M, Y, K] values used to print each patch. As an example of how the calibration process is implemented, FIG. 3 shows a flow chart for processing of a sample print code. A print code of [C=100, M=30, Y=200, K=75] is selected which will print color patch #1 at some color. When patch #1 is developed, scanned and analyzed, the tristimulus values are found to be [Xp=90, Yp=50, Zp=150]. The [C=100, M=30, Y=200, K=75] print code or signal that generated this measured print value of [Xp=90, Yp=50, Zp=150] is then stored in two arrays in look up table 14. This process is repeated until every printer code is mapped into a measured print value.

It is understood that the tristimulus values [Xp,Yp,Zp] measured in this way are specific to the type of paper, type of halftones or solid area, type of developer, etc. being used in the printer to print the test patches. If any of these important parameters are changed, the calibration must be redone. In actual practice, many calibrations may be done and stored to represent the various operating conditions of the printer. It may be necessary to use several different calibrations for one print, especially if halftoned areas and solid areas are placed on the same print.

MONITOR CALIBRATION

Figure 4:
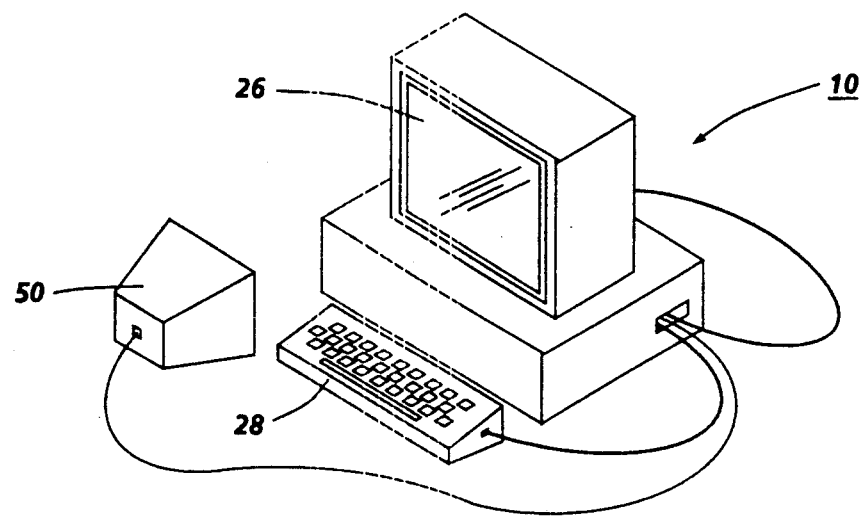
FIG. 4 is a schematic drawing of the monitor being calibrated in conjunction with a monitor calibration device.
Figure 5:
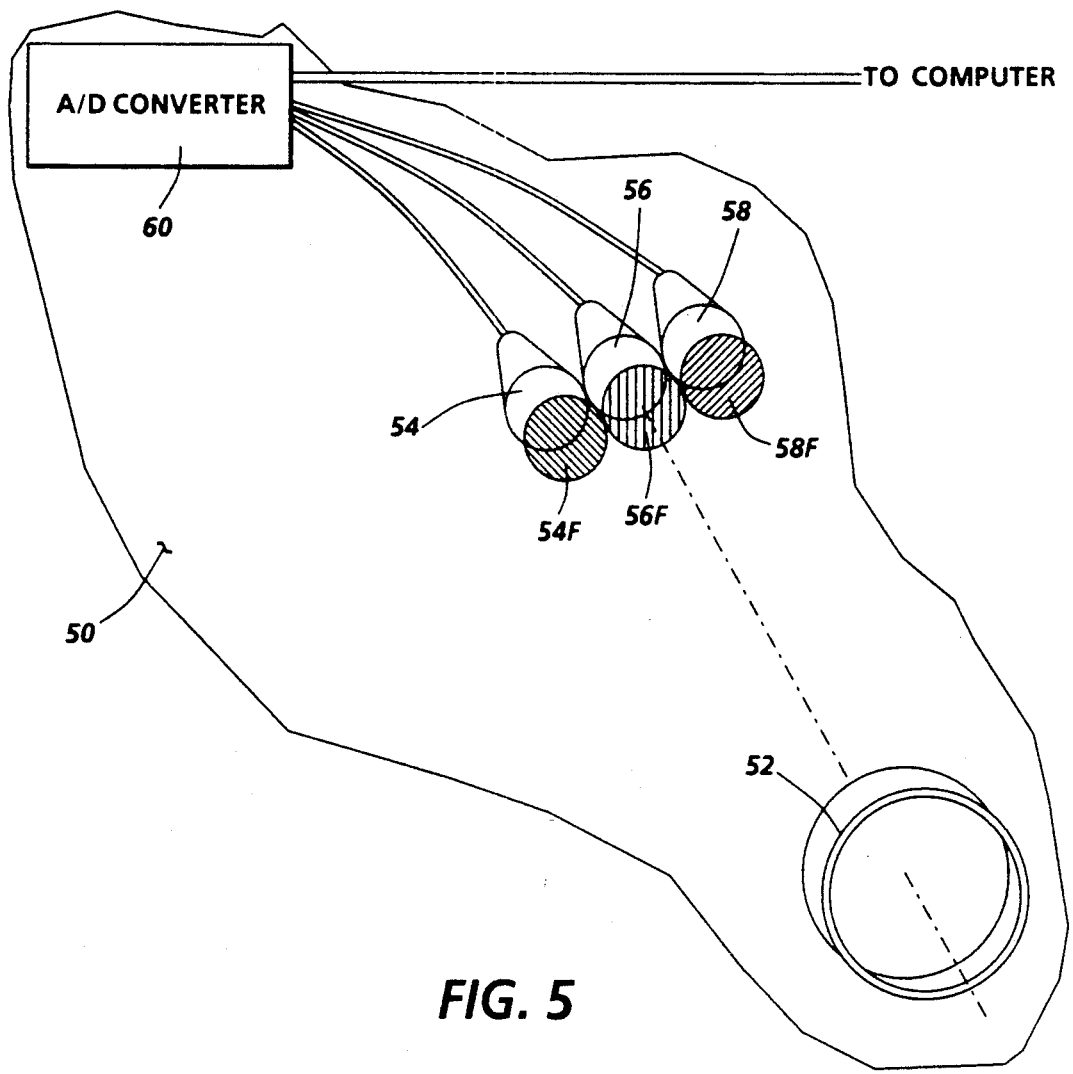
FIG. 5 is a schematic of the components of the monitor calibrating device.

Following the calibration of the printer, the monitor 26 must be calibrated, as shown, with reference to FIGS. 4 and 5. The monitor 26 to be calibrated may be any color CRT device. As is known, the monitor includes three electron guns, each gun corresponding to a red, green, or blue phosphor set carried on the CRT screen. Each electron gun delivers a beam of electrons to the screen to excite the associated phosphor set. The phosphor set glows at a luminous intensity level that corresponds to the beam current or control level of the gun. The beam is raster-scanned over the screen in response to conventional beam deflection mechanisms. The monitor receives control signals from the computer 10. The control signals are coded digital signals identifying a control level for driving a particular electron gun. The monitor driver decodes the signals and drives the gun accordingly. A monitor calibrating device 50, shown in schematic form in FIG. 5, consists of a lens 52 and photodiodes 54, 56, 58, with red, blue, and green filters 54F, 56F, 58F, respectively, over each diode to simulate the tristimulus CIE responses. The lens 52 images the monitor screen onto the photodetectors at approximately the distance an operator would be viewing the screen. (It is also possible to eliminate the lens by placing the photodetectors a specified distance from the monitor screen to simulate how the eye views the screen.) Any room light which is reflected from the screen will be measured by the photodiodes, just like the eye views the screen. Because the room light is measured, this calibration process ultimately results in a print whose appearance closely resembles the monitor screen, when the screen is viewed under the ambient room light conditions. This device is configured to represent as closely as possible how the human eye views the monitor screen. Many other locations and orientations of this device are possible. For example, the device could be hidden inside the monitor, and the room lights taken into account, by measuring the irradiance at the screen surface with a fiber optic probe. The fiber optic relays the light to the hidden [B, G, R] CIE detectors. The screen color, [Xm, Gm, Rm], could also be measured with fiber optic probes.

Within the monitor calibrating device 50, the signals from the three photodiodes are sequentially passed through an A/D converter 60. The output from the A/D converter would be appropriately operated upon to make it compatible with the workstation, computer, or PC system being calibrated. The monitor calibrating device would be connected to computer 10 through an RS-232, or other appropriate interface. The operator would then run the monitor calibration software, via controller 12. The monitor calibration software would sequentially change the color of the entire monitor screen, bringing up all possible colors that the computer is capable of generating on the screen. As each color is brought up on the screen, the monitor calibration device would send to the computer system the digitized readings of the three photodiodes, each of which is seeing the screen through a different color filter. Because the calibrating device is viewing the screen from the same distance, and under the same lighting conditions that the operator views the screen, this screen calibration compensates for the actual viewing conditions under which the screen is being observed. Since the software is generating the different screen colors by assigning a value to the blue, green, and red (B, G, R)

guns in the monitor, the calibration results in a mapping of the colors requested by the software to the colors actually measured by the calibrating device, which is a close approximation to what the operator's eye would see on the screen. This mapping would result in two arrays of 4 numbers each, with each combination of software requested [patch#, Bm, Gm, Rm] codes corresponding to a measured combination of [patch#, Xm, Ym, Zm] values on the screen.

Figure 6:
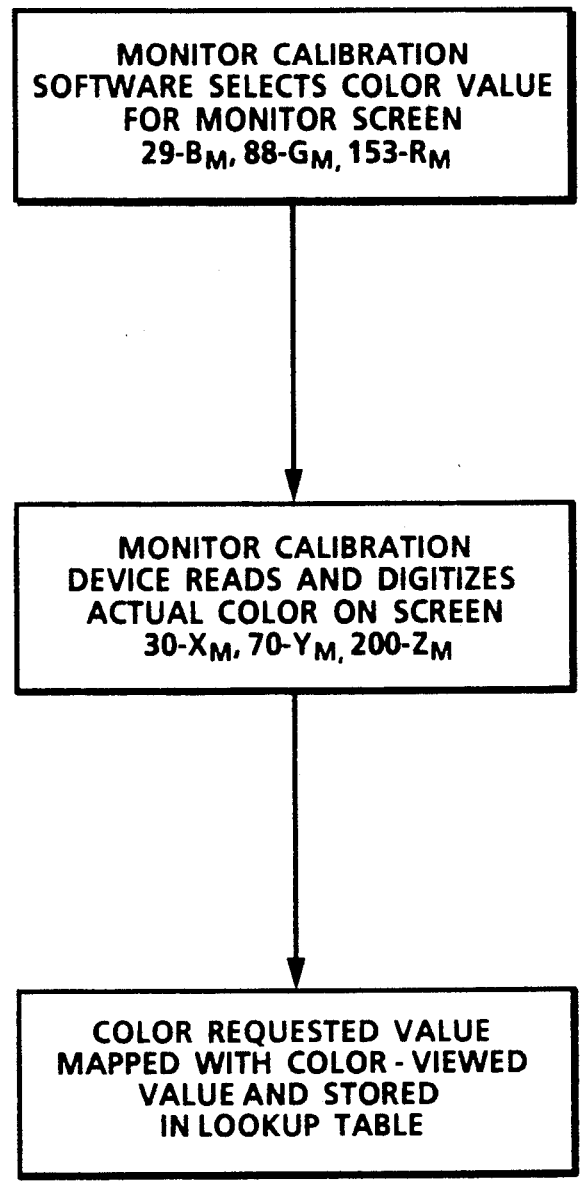
FIG. 6 is a flow chart showing the monitor calibration process.

Referring to FIG. 6, and as one specific example of the monitor calibration process, it is assumed the monitor calibration software has selected a color value of [Bm=29, Gm=88, Rm=153] to be displayed on the monitor screen. The monitor calibration device views the screen and provides digitized output signals to the computer identifying that a color of 30-Xm, 70-Ym, 200-Zm would actually be viewed by the operator under the particular lighting conditions. This is entered into look up table 14 (See FIG. 1), thus establishing a correspondence between a requested color value and a measured monitor value; e.g. when a color value of [Xm=30, Ym=70, Zm=200] is requested in the future, the computer will energize the gun with values of [Bm=29, Gm=88, Rm=153]. The entire color gamut of the monitor screen is thus mapped and identified with the corresponding gun values which will provide the specific color.

PRINTER/MONITOR CALIBRATION

Because the colors on the print saturate at a lower level than those on the monitor, many of the [Xm, Ym, Zm] values measured by the monitor calibrating device would not correspond to any of the [Xm, Ym, Zm] values measured on the test pattern print. With the information from the printer calibration, the software, is able to determine if a given combination of codes to the B, G, R guns is inside or outside the color range of the printer. Using this information, the software would limit the range of colors available to the operator on the monitor, to fall within the range which the printer can create. Within this color range, the colors measured on the monitor would be mapped in terms of their [Xm, Ym, Zm] values, to the patches with the closest matching [Xp, Yp, Zp] values on the printed test pattern. This mapping would be used to calibrate the monitor/printer combination. The calibration would result in the mapping of a [Bm, Gm, Rm] code for the monitor guns, to the appropriate [C, M, Y, K] code which creates the patch which most closely approximates the color created on the monitor screen by that B, G, R gun code. This mapping would be in the form of two arrays, one of 4 numbers and the other of 5 numbers.

Figure 7:
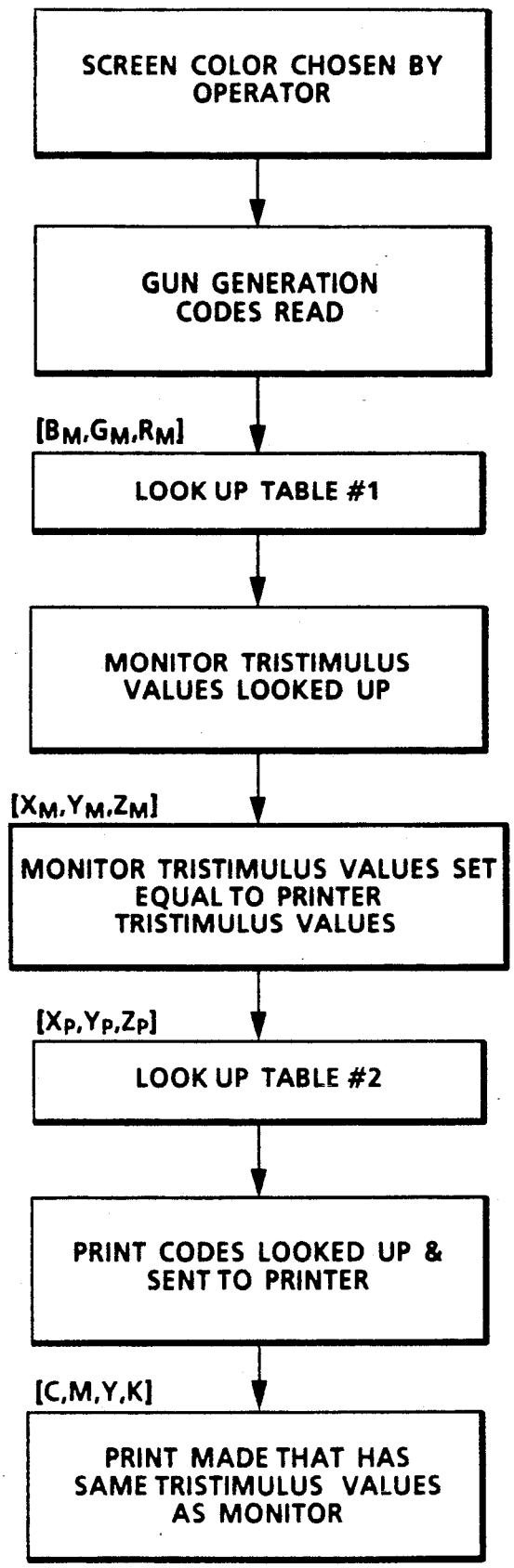
FIG. 7 is a flow chart showing generation of a color print following the printer and monitor calibration.

As an example, in referring to FIG. 7, which is a flow chart of operation, following the initial calibration procedures, a specific example of the Printer/Monitor system calibration process is given. The calibration procedures described above result in two look up tables, 1 and 2. Monitor calibration look up table 1 relates the monitor electron gun codes, for example, [Bm=190, Gm=95, Rm=220] used to generate a particular monitor color to the measured color tristimulus values (in this example [Xm=70, Ym=30, Zm=200]) for that particular monitor color. Since we wish the print to have the same tristimulus values as the monitor, we enter the monitor tristimulus values into the printer look up table. That is, we set [Xm, Ym, Zm]=[Xp, Yp, Zp]=[70, 30, 200]. The printer calibration look up table relates the printer tristimulus values to the print codes [C=37, M=82, Y=220, K=108] that are used to generate the print of that particular color. These print codes are then sent to the printer resulting in a printed color that has the same tristimulus values, hence, the same color as the monitor. In actual practice, look up table 1 and 2 can be combined into one table.

In operation, following calibration, the operator would adjust the color of an image on the screen display, through the software. His choice of colors would be limited by the software, to those falling within the range which the printer is capable of creating. Once the operator has decided that the appearance on the screen is how he wants it, the software would then know that, in order to produce any particular color which the operator has selected, it must send the combination of [C, M, Y, K] values to the printer which appear in the [C, M, Y, K] array correlated with the monitor electron gun generation code that produced that particular color on the screen (See FIG. 5). Thus, the software now knows how to achieve, on the print, the closest possible approximation to the actual colors appearing on the screen, as seen by the operator.

When the print is viewed using the same spectral illumination conditions that exists in the input scanner, the color matching will be optimized. In order to optimize this color matching, a viewing lamp, with a spectral output matching the spectral output of the input scanner lamp, should be used. In addition, good approximations to optimized color matching, between the screen and the print, can be obtained for other typical lighting conditions such as daylight, cool fluorescent, warm fluorescent, or incandescent. These approximations would be made by modifying the arrays, using the knowledge of the spectral output of these typical sources. The operator could then select whether he wanted the color matching to be optimized for the special viewing lamp, or one of the typical lighting conditions noted above, or any other lighting condition whose spectra was known. The details of modifying the arrays are found in standard textbooks such as Billmeyer & Saltzman, "Principles of Color Technology", Interscience Publishers, 1966.

In summary, Applicants have provided a system for ensuring that the color viewed on a color screen by an operator and a color print made from the screen image will be visually matched. The faithful representations are generated by first calibrating the printer to ensure that the [C, M, Y, K] print codes are associated with [Xp, Yp, Zp] measured print tristimulus values. The monitor is calibrated to associate a monitor generation electron gun code [Bm, Gm, Rm] with every possible color [Xm, Ym, Zm], produced on the screen. The system is calibrated to ensure that the desired color image on the print will be printed with the print code associated with the color being viewed.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. A method for calibrating a color printing system which includes a color CRT monitor, color printer, and source of digital color signals including the steps of:
   storing in a controller memory, a predetermined number of sets of C, M, Y, K print codes, each set associated with a specific color value to be printed, applying each of said print codes sequentially to the color printer for producing color output prints carrying color patches, each color patch corresponding to a specific C, M, Y, K print code applied to said printer, measuring each said color patch under a particular set of spectral illumination conditions and establishing tristimulus values Xp, Yp, Zp, for each measured color patch, correlating each measured Xp, Yp, Zp value with the associated C, M, Y, K print code, and storing each correlation in a memory look up table, storing in said controller memory, a predetermined number of sets of coded digital signals Bm, Gm, Rm, representative of all possible colors capable of being created on a particular color CRT monitor, applying said sets of coded digital signals sequentially to an associated electron gun of said color CRT monitor, each coded digital signal set creating a color image with a specific Bm, Gm, Rm gun code value, measuring each said color image in an environment which closely approximates the actual viewing condition of an operator observing the color image at a specific distance from the monitor, each measurement establishing a set of tristimulus values, Xm, Ym, Zm, and correlating each measured Xm, Ym, Zm set with the associated Bm, Gm, Rm set, and storing each correlation in said memory look up table.

comparing the color range of the printer to the color range of the monitor and limiting the Xm, Ym, Zm range to the Xp, Yp, Zp range, whereby upon selection by an operator of a print operation to print a specific color image displayed on the monitor, a print code C, M, Y, K is generated which is correlated with the stored monitor gun code that produced that particular color image on the monitor resulting in an output print that has the same tristimulus values as the color image on the screen.

2. The method of claim 1 wherein said color patch measuring step includes the steps of scanning said color print with a RIS scanner which includes a linear color CCD array.

3. The method of claim 1 wherein said color monitor image measuring step includes the steps of imaging the monitor image onto a plurality of photodetectors to simulate the tristimulus response.

4. The method of claim 3 wherein said monitor image is focused onto said photodetectors by a lens.

5. The method of claim 3 wherein the photodetectors are placed a specified distance from the monitor, said distance corresponding to the distance at which an operator would be viewing the monitor.

6. The method of claim 1 including the further step of viewing said color print under the same spectral illumination used in said color patch measuring step.

7. A method for generating a color print having the same tristimulus values as a color image displayed on a color CRT monitor screen including the steps of:

storing in a controller memory, a predetermined number of sets of C, M, Y, K print codes, each set associated with a specific color value to be printed, applying each of said print codes sequentially to a color printer for producing color output prints carrying color patches, each color patch corresponding to a specific C, M, Y, K print code applied to said printer, measuring each said color patch under a particular set of spectral illumination conditions and establishing tristimulus values Xp, Yp, Zp, for each measured color patch, correlating each measured Xp, Yp, Zp value with the associated C, M, Y, K print code, and storing each correlation in a memory look up table, storing in said controller memory, a predetermined number of sets of coded digital signals Bm, Gm, Rm, representative of all possible colors capable of being created on a particular color CRT monitor, applying said sets of coded digital signals sequentially to an associated electron gun of said color CRT monitor, each coded digital signal set creating a color image with a specific Bm, Gm, Rm gun code value, measuring each said color image in an environment which closely approximates the actual viewing condition of an operator observing the color image at a specific distance from the monitor, each measurement establishing a set of tristimulus values, Xm, Ym, Zm, and correlating each measured Xm, Ym, Zm value with the associated applied Bm, Gm, Rm values, and storing each said correlation in said memory look up table comparing the color range of the printer to the color range of the monitor and limiting the Xm, Ym, Zm range to the Xp, Yp, Zp range, providing a digital input signal to the monitor representing a color image to be printed, adjusting the initially observed color image to obtain a desired final color image said final color image having a color range limited to that capable of being reproduced by the printer, and sending a print code to the printer which is correlated to the stored monitor gun code that produced that particular color image on the screen whereby the color print produced has the same tristimulus values as the color image on the screen.

8. A method for calibrating a color printing system consisting of a color CRT monitor, computer, color printer, and communication link so that a computer generated value is sent to the printer using a print code which prints a color image having the same trichromatic coefficient values as that of the image on a monitor screen, including the steps of:

calibrating a color CRT monitor with three electron guns each associated with a different color so that a computer generated RGB value is sent to the electron guns to form a color image on said monitor, and calibrating the printer to the monitor so that, for a specific range of monitor generation electron gun code input which produce a color image with specific trichromatic coefficient values on the monitor, an associated print code is generated for providing a color print having the same trichromatic coefficient values as that of the monitor color image, the monitor range being limited to the range of the values of the print code.

9. The method of claim 8 wherein said step of calibrating the printer to the monitor includes the step of identifying for each requested color to be viewed on the monitor, a print code which has previously been determined to result in a print with the same color image.

* * * * *